United States Patent [19]

Someno et al.

[11] Patent Number: 5,429,998
[45] Date of Patent: Jul. 4, 1995

[54] CRYSTALLINE SIALON HAVING WURTZITE STRUCTURE

[75] Inventors: Yoshihiro Someno, Shibata; Toshio Hirai, 3-4-91 Takamori, Izumi-ku, Sendai-shi, Miyagi-ken; Makoto Sasaki, 3-1-3 Minamikoizumi, Wakabayashi-ku, Sendai-shi, Miyagi-ken, all of Japan

[73] Assignees: Alps Electric Co., Ltd., Tokyo; Toshio Hirai; Makoto Sasaki, both of Sendai, all of Japan

[21] Appl. No.: 134,955

[22] Filed: Oct. 12, 1993

[30] Foreign Application Priority Data

Jan. 7, 1993 [JP] Japan .................................. 5-018098

[51] Int. Cl.$^6$ ............................................. C04B 35/58
[52] U.S. Cl. ....................................................... 501/98
[58] Field of Search ..................................... 501/98, 96

[56] References Cited

U.S. PATENT DOCUMENTS 3,991,166 11/1976 Jack et al. .
4,818,635 4/1989 Ekström et al. ................... 501/98 X

*Primary Examiner*—Karl Group
*Attorney, Agent, or Firm*—Guy W. Shoup; Patrick T. Bever

[57] ABSTRACT

A crystalline sialon comprising crystals containing aluminum, silicon, nitrogen and oxygen, in which the crystal structure has a hexagonal system wurtzite structure identical with that of AlN crystals, and the volume of the unit cell thereof has a value smaller than that of the AlN crystals. The crystalline sialon can be synthesized by mixing a silicon-containing gas, an aluminum halide, a nitrogen atom-containing gas and an oxygen atom-containing gas, converting the gas mixture into plasmas by microwave discharging and depositing a film on the surface of a substrate, in which the temperature of the substrate, while controlling a flow rate of the silicon-containing gas and a flow rate of the oxygen-containing gas. The crystalline sialon of the present invention has high hardness, is excellent in oxidation resistance, as well as excellent in heat conductivity and adhesion with a superhard substrate.

2 Claims, 17 Drawing Sheets

Al-Si-O-N FILM OF CRYSTALLINE WURTZITE STRUCTURE

AMORPHOUS FILM

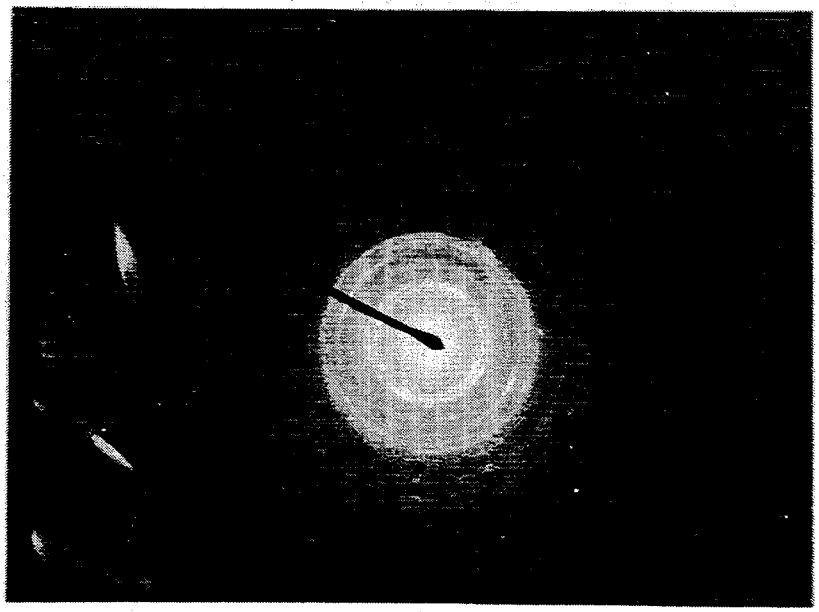
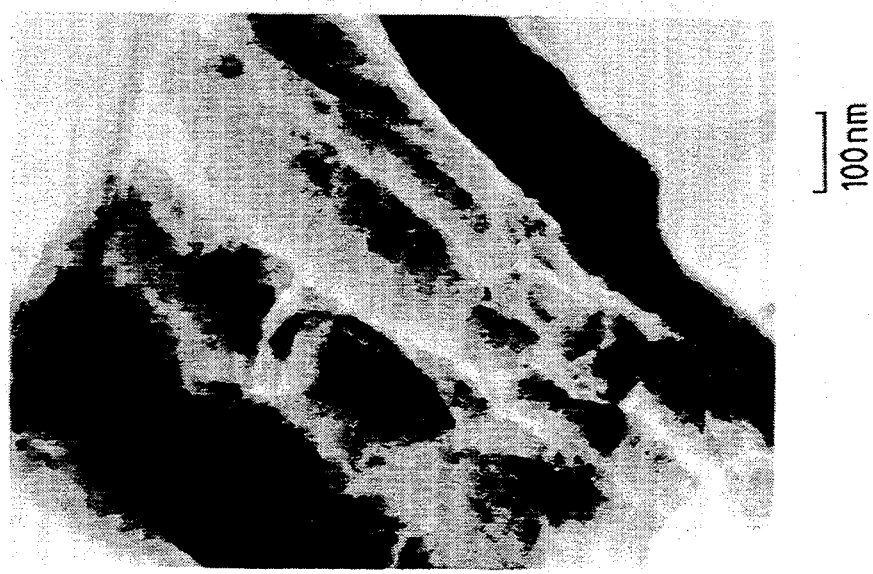

100 nm

Al-Si-O-N FILM OF CRYSTALLINE WURTZITE STRUCTURE

800°C

900°C

1100°C

15 μm

AMORPHOUS FILM

800°C

900°C

1100°C

15 μm

CRYSTALLINE SIALON HAVING WURTZITE STRUCTURE

BACKGROUND OF THE INVENTION

Field of the Invention

The present invention concerns a sialon of wurtzite structure excellent in hardness and oxidation resistance, as well as heat conductivity, which is usable effectively for dies and machinery parts, as well as a synthesizing method therefor.

Crystalline sialon has been studied earnestly mainly in England and Japan from since it was pronounced by Professor Jack in England in 1976.

Sialon is a generic term for crystalline materials containing Si, Al, O and N for which each of $\beta'$, $\alpha'$, X and O' phases and a polytypoid phase (15R, 12H, 21R, 27R, etc.) have been known. Among them, $\beta'$ sialon has the same structure as $\beta$-$Si_3N_4$ (phenacite structure), and a composition of $Si_{6-z}Al_zO_zN_{8-z}$ (z=0.5−4.2). The mechanical characteristics is different depending on the value z in which the mechanical characteristic is higher for the lower z value and the highest mechanical property with 18 GPa of hardness and 900 MPa of bending strength is attained at z=0.5, and the bending strength does not deteriorate as high as the vicinity of 1000° C. Furthermore, the crystalline sialon has such excellent high temperature characteristic as it is stable to molten metal such as Al.

Therefore, $\beta'$ sialon has been produced by a sintering process by a number of manufacturers including those in this country.

However, since $\beta'$ sialon marketed at present is obtained by adding a sintering aid such as MgO or $Y_2O_3$ to a starting powdery mixture of $Si_3N_4$ $SiO_2$—AlN system or $Si_3N_4$—$Al_2O_3$—AlN system and sintering them at 1700°–1800° C. in a nitrogen gas stream, sintering products include defects such as pores or grain boundary impurity phase, to vary various characteristics such as strength and improvement therefor is expected.

In view of the above, if crystalline sialon can be synthesized by a gas phase process, the sintering aid is no more basically necessary and it can be expected to obtain homogeneous products at high density and purity. Further, if crystalline sialon can be synthesized on substrates made of various materials by a gas phase process, additive value of sialon as the material can be improved remarkably.

Si—Al—O—N system materials have heretofore been synthesized by a sputtering process using crystalline sialon prepared by a sintering process as a target. However, the resultant Si—Al—O—N system material obtained by the sputtering process is amorphous, the hardness of which is about 14 GPa and the deposition rate is as low as about 15 nm/min.

Other than the sputtering process, Si—Al—O—N system materials have been synthesized, in few cases, by hot CVD process and reactive PVD process. Landingham, et al of California University tried to synthesis sialon on a graphite substrate by using a $AlCl_3$—$SiCl_4$—$NH_3$ gas system, but it only produced an amorphous Si—Al—O—N system material which was not crystalline sialon. Further, Chin, et al of General Atomic Co. tried to synthesize a Si—Al—O—N system material by a reactive ion plating process, but the resultant product was also amorphous and, therefor, it has not yet been realized till at presence to synthesize crystalline sialon by the gas phase process.

OBJECT AND SUMMARY OF THE INVENTION

In view of the above, it is an object of the present invention to provide a method of synthesizing crystalline sialon having excellent mechanical characteristics and heat resistance in a low temperature region capable of avoiding thermal deterioration of a substrate or a device, by using a plasma CVD process.

In the present invention, a plasma CVD process is adopted for synthesizing crystalline sialon at a low temperature. In the plasma CVD process, since a starting gas is decomposed by using plasmas, a substrate temperature can be lowered and low temperature synthesis is possible.

The plasma CVD process is generally classified depending on the method of exciting plasmas. A direct current bias system has been used long since and requires only a simple structure but it has not been used generally in recent years. In recent years, a non-electrode discharge system using a microwave in a RF (13.56 MHz) range.

On the other hand, a plasma exciting system using a ultramicrowave in a microwave (MF) range is a non-electrode exciting system like that the RF system and it is a relatively new method which causes plasma excitation by a microwave usually at 2450 MHz.

Intermediate reaction products such as radicals or ions produced by decomposition and excitation of gas species introduced in plasmas have an important role in a film-forming reaction step in the plasma CVD process. Accordingly, it is important that the introduced gas species are decomposed efficiently into each of intermediate reaction products in the plasmas.

When an electric field is applied to molecules having permanent dipoles, the molecules are subjected to polarized orientation. Further, if the electric field is alternated, the molecules under polarized orientation turn their direction depending on the direction of the electric field. As the alternating frequency is increased, the molecules can no more follow after the direction of the electric field gradually to increase the internal energy. The internal energy is given by the following equation:

$$K \cdot f \cdot E^2 \cdot \epsilon_\gamma \cdot \tan \delta$$

in which P: an absorption energy per unit area (unit: $W \cdot m^{-2}$), f: frequency (Hz), E: electric field intensity ($V \cdot m^{-2}$), $\epsilon_\gamma$: specific dielectric constant of molecule, $\tan\delta$: dielectric loss angle and K: constant.

As shown by the equation described above, the energy (P) absorbed in the molecule is determined depending on the frequency (f), the electric field intensity (E) and the dielectric constant ($\epsilon_\gamma$) inherent to each of the molecules. This means that in the plasma CVD process, the dissociation efficiency of the gas introduced into plasmas is greater as the frequency of a plasma excitation source is higher under an identical electric field intensity. Also, the above-mentioned equation shows that the dissociation efficiency changes by ($\epsilon_\gamma \cdot \tan\delta$) of the gas introduced and that the change of the plasmas varies by the kind of the gases.

In the plasma CVD process electrons at high density have an important role for dissociation or ionization of gas molecules required for forming a thin film. Generally, the electron density and the plasma excitation frequency have a relationship as shown by the following equation:

$$ne = K \cdot f^2$$

where ne: electron density, f: excitation frequency and K: constant.

Further, the maximum energy of ions in the plasmas is given by the following equation:

$$Ie = (Q \cdot E)^2 \cdot (K \cdot f^2 \cdot M)^{-1}$$

where Ie: ion kinetic energy, f: frequency, Q: ion charges, M: ion mass, E: electric field intensity and K: constant.

The above-mentioned equation shows that Ie decreases along with increase of f providing that Q, M and E are maintained under identical conditions.

In the plasma CVD process, a thin film formed on a substrate in a reaction chamber is simultaneously etched by high energy electrons and halogeno radicals in the plasmas. In view of the above, for forming a film of high purity and high stability at a high velocity, it is important to increase the density of electrons having an appropriate energy. This is enabled by increasing the electron density (ne) by making the frequency (f) higher and decreasing the ion kinetic energy (Ie). However, as has been described above, there is a limit for the increase of the frequency depending on the kind of the starting material gases introduced.

Further, in the synthesis of a sialon film by the plasma CVD process, selection of Al starting material is an important subject.

The Al starting material is generally classified into two groups. One is aluminum halides and another is organic metal compounds.

Among the aluminum halides, $AlCl_3$ is a most popular raw material used long since because it is less toxic or hazardous and inexpensive as well. $AlCl_3$ is a subliming starting material having a melting point at 190° C. Accordingly, when $AlCl_3$ is heated and supplied by using a carrier gas into a reaction chamber, the amount of $AlCl_3$ carried varies depending on the surface area of the starting material (granular or powdery). In addition, it is necessary to heat a pipeline for feeding $AlCl_3$ to a temperature higher than the melting point of $AlCl_3$, which brings about a problem of making the stable supply of $AlCl_3$ difficult and resulting in difficult reproducibility of the film.

The organic metal starting materials are excellent in view of the stable supply of the starting material since they have generally low melting point and show wide temperature range in which they are present as liquid and have been used frequently in recent years. Among the organic metal Al starting materials, trimethyl aluminum (TMA: $Al(CH_3)_3$) is used most frequently. However, TMA has a drawback that carbon is liable to be mixed in low temperature synthesis such as by a plasma CVD process and involves a problem in view of safety such as atmospheric ignition. Intrusion of carbon into the film causes deterioration of insulation characteristics to bring about a significant problem.

On the other hand, $AlBr_3$, a sort of aluminum halides, remains as liquid from its melting point of 97.5° C. and boiling point of 268° C. and a vapor pressure (100 mmHg at 180° C.) is also at a practical level. Further, since $AlBr_3$ comprises a dimer, it can be decomposed and dissociated by a smaller energy as compared with $AlCl_3$ having a octahedron structure in which chlorine crosslinking is developed.

From the foregoings, the present invention selects a microwave plasma CVD system having higher radical dissociation effect and uses $AlBr_3$ for the aluminum starting material.

Feature of Al—Si—O—N Synthesized by Plasma CVD Process of the Present Invention

The crystalline sialon according to the present invention has a wurtzite structure and can be synthesized at a temperature within a range from 530° C. to 770° C.

The crystalline sialon according to the present invention has the following features.

(1) Deposition speed is about 130 nm/min, which is about ten times as high as that in the sputtering process.

(2) It has a micro Vickers hardness of greater than 30 GPa, which is more than twice of that in existent Si—Al—O—N system amorphous thin films.

(3) It has a smoothness with the surface roughness Ra of less than 0.01 μm and has such an excellent heat resistance that the surface smoothness is not lost even under heat treatment in an ambient atmosphere at 900° C. for 12 hours.

(4) It has thermal diffusion rate of 0.4 $cm^2$/s (room temperature) which is a value five times as large as the thermal diffusion rate of 0.08 $cm^2$/s (room temperature) of β' sialon synthesized by a sintering process, and has excellent heat conductivity.

(5) Critical load of more than 40N (Newton) is obtained for adhesion with a super hard alloy by way of an AlN film as an intermediate phase by a scratch test method and it is extremely excellent.

The Al—Si—O—N film according to the present invention having the foregoing characteristics can be expected to have such application uses as abrasion resistant protection films for tools, as well as heat resistant protection films for heat forming dies, for example, in die cast, abrasion resistant protection films for thermal heads (amorphous Si—Al—O—N films synthesized by the sputtering process have been used so far) and, further, machinery parts such as journal bearings or ball bearings.

BRIEF DESCRIPTION OF THE DRAWINGS

These and other objects, as well as advantageous features of the present invention will become apparent by reading the following descriptions for the preferred embodiments with reference to the accompanying drawings, wherein

FIGS. 14(a) and 14(b) show a synthesis examples under a condition of $SiH_4$ gas flow rate at 20 (sccm) in which (a) is electron microscopic photograph showing the crystal structure and (b) is X-ray photograph;

DESCRIPTION OF THE PREFERRED EMBODIMENTS

EXAMPLE

Figure 1:
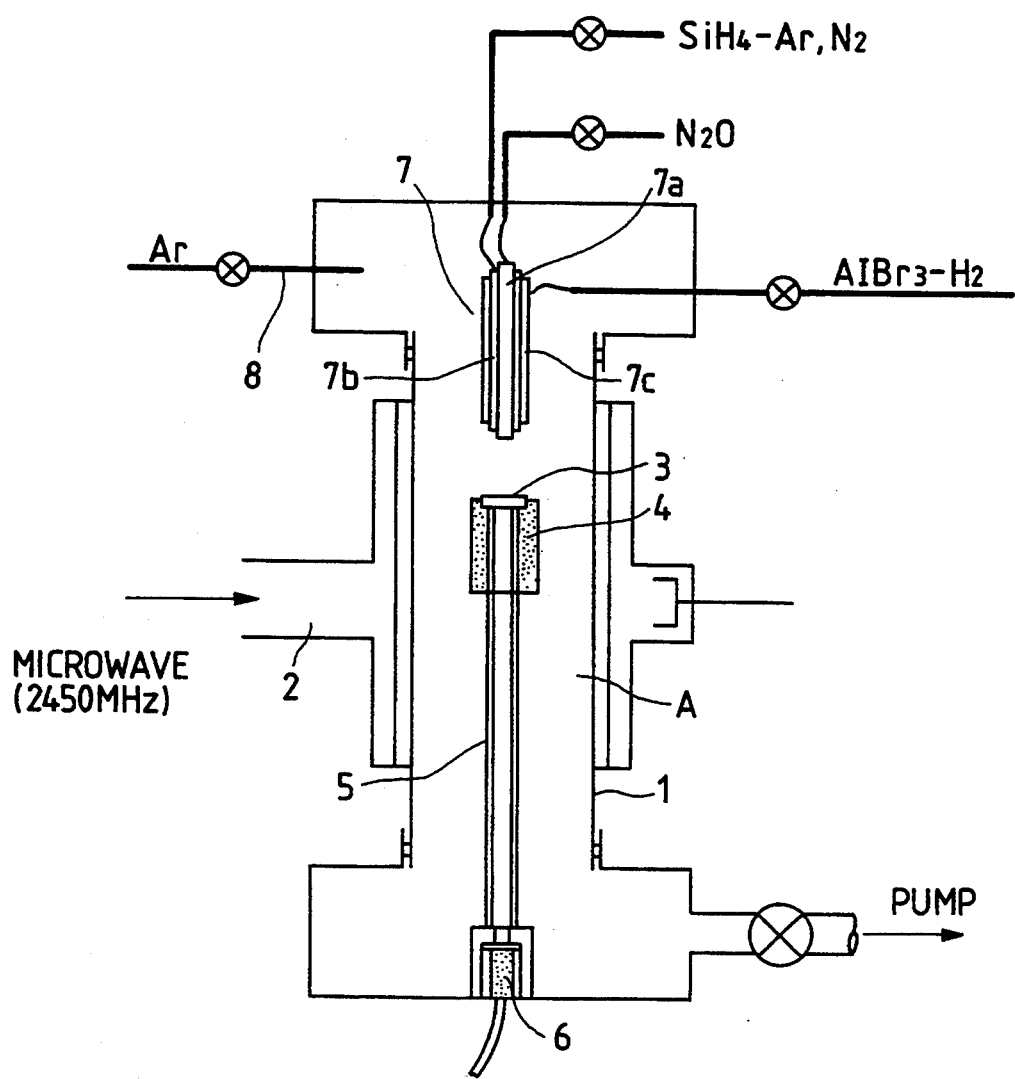
FIG. 1 is a cross sectional view of a plasma CVD apparatus used in a synthesizing method according to the present invention.

FIG. 1 shows an outline for the constitution of a plasma CVD apparatus used in the present invention and Table 1 shows synthesis conditions.

In FIG. 1, a tubular reactor 1 is made of a quartz tube or the like, which defines a reaction chamber A at the inside. A microwave at 2.45 GHz oscillated from a cyclotron is given from a wave guide 2 to the reaction chamber A. A silicon (Si) substrate 3 is held on a susceptor 4 in the reaction chamber A. The susceptor 4 is supported by a quartz tube 5 and a detection head of an optical high temperature meter 6 is housed at the inside.

A gas supply nozzle 7 is disposed to an upper end of the reaction chamber A. The gas supply nozzle 7 comprises a triplicate tube. A laughing gas ($N_2O$) is introduced into a tube 7a at the center of the triplicate tube for supplying oxygen atoms and a monosilane gas as a Si starting material is supplied to an intermediate tube 7b at the outer circumference thereof. The monosilane gas ($SiH_4$) is diluted with an argon gas (Ar) at a $SiH_4$ concentration of 4.95 mol %. $SiH_4$ diluted with Ar and a nitrogen gas ($N_2$) are supplied to the tube 7b.

A bromide gas ($AlBr_3$) is supplied as the material for supplying aluminum atoms to the outermost circumferential tube 7c of the triplicate tube. The bromide gas is kept at a constant temperature in a bubbler of a thermostable chamber and supplied into the tube 7c using a hydrogen gas ($H_2$) as an introduction gas.

Each of the starting material gases, i.e., $AlBr_3$—$H_2$, $SiH_4$—Ar, $N_2$ and $N_2O$ gas are introduced through separate paths into the reaction chamber A by way of a gas supply nozzle 7 of the triplicate structure made of quartz and then mixed in the vicinity of the substrate. The temperature of the substrate 3 was set to an optional level by varying tile microwave output and the mass of the susceptor. Further, the surface position of the substrate 3 was made higher by about 40 mm than the channel center for the microwave, and the lower end position of the gas supply nozzle 7 was also made higher by about 40 mm than the surface of the substrate 3. This is so arranged because synthesis is most accelerated in an upper or lower portion deviated from the center of a plasma generation region in the reaction chamber A and, in addition, the jetting port of the gas supply nozzle 7 situates in the plasma region if the substrate is disposed below the plasmas, by which reaction is caused in the triplicate tube to deposit synthesis products on the inner surface of the triplicate tube.

Further, an argon gas (Ar) is supplied into the reaction chamber A by a pipe channel 8 separate from that for the nozzle 7 of the triplicate tube. By supplying the argon gas from the upper portion of the apparatus to the outside of the plasma generation region in the reaction chamber A, dissociation into neutral particles, ions, electrons, etc. in the plasmas is accelerated. In addition, in a ease of a coaxial type microwave plasma CVD, plasmas are liable to undergo the effect of an electric field which is made greater at a tube wall portion in the reaction chamber and made lower at a central portion in which the substrate 3 is disposed, so that the plasma region tends to become uneven. However, if the argon gas is supplied from the outside of the plasma region, the plasma region is extended. Further, in a case of single atom molecule such as an argon gas, it less causes recombination once after it has been decomposed in the plasmas and, if it should cause recombination, does not deprive the energy therearound and keeps continuous decomposition. Therefore, it is expected that this constitutes a sort of ignition source to extend the plasma region. This creates an identical state as if degree of vacuum were increased in the existent plasma CVD and, furthermore, can avoid such a disadvantage as simply increasing the degree of vacuum, for example, a disadvantage that the density of the electrons is increased to lower the film forming velocity. Such extension of the plasma region and improvement of tile radical dissociation rate can provide stable synthesis and increase the film-forming velocity as well.

The synthesis conditions are as shown in the following Table 1.

TABLE 1

| | |
|---|---|
| Microwave power (2450 HMz) | 900–700 W |
| Substrate temperature | 770–530° C. |
| Temperature of thermostable chamber for $AlBr_3$ | 180° C. |
| Total gas pressure in reaction chamber | 0.4 torr |
| Gas supply amount: | |
| $AlBr_3$ | $1.37 \times 10^{-4}$ (mol · min$^{-4}$) |
| $H_2$ | 40 sccm |
| $N_2$ | 50 sccm |
| $N_2O$ | 0.2–2.5 sccm |
| $SiH_4$—Ar | 0–100 sccm |
| Ar | 175 sccm |

The tissue and the structure of films formed on the surface of the substrate 3 by the apparatus and the synthesis conditions described above were analyzed by using XRD, IR, SEM and TEM. The compositions for the films were measured by using AES and compensated using, as a standard value, the result for the measurement of $\beta'$ sialon synthesized by the sintering process. The film thickness and the surface roughness were measured by using a probe type micro step meter (LANK TAYLER HOBSON TALYSTEP).

Figure 2A:
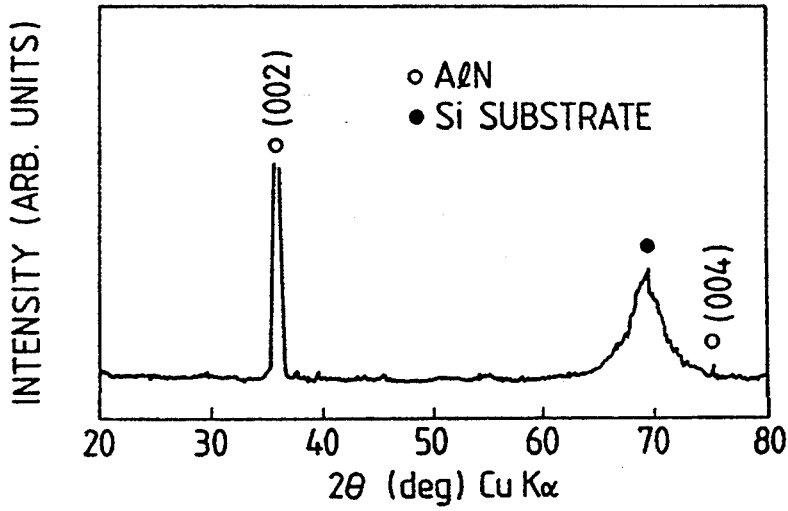
FIGS. 2A–2C are diagrams illustrating X-ray diffraction pattern for films synthesized at a substrate temperature of 530° C.
Figure 2B:
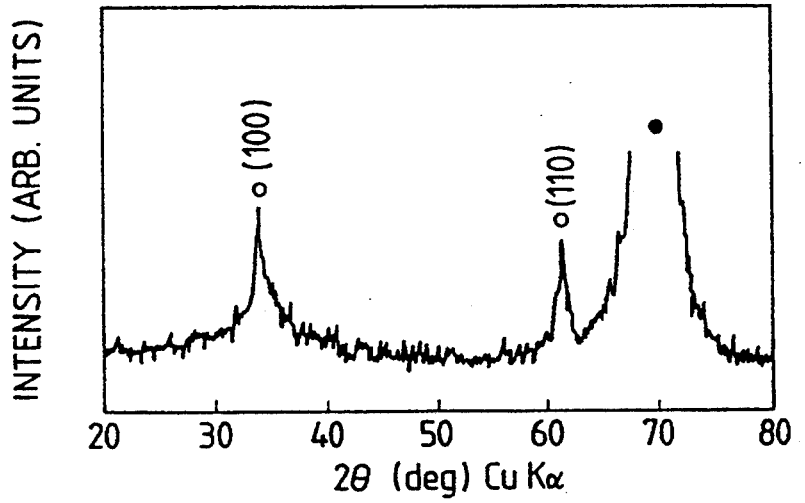
Figure 2C:
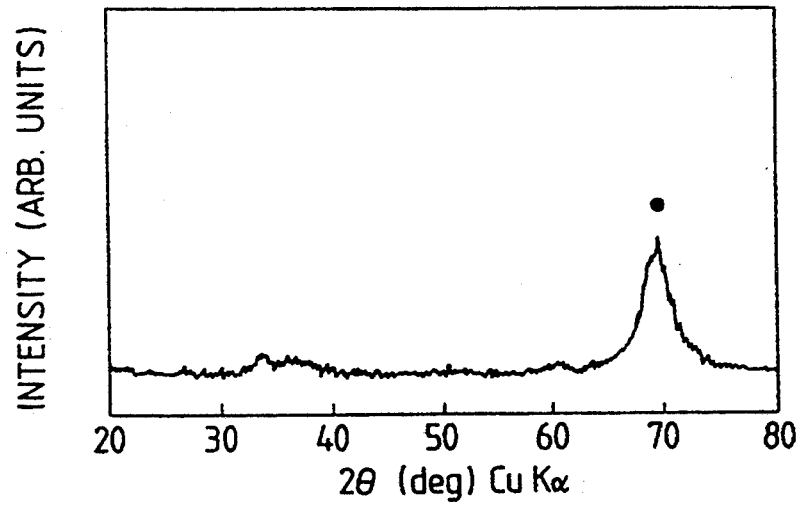
Figure 3:
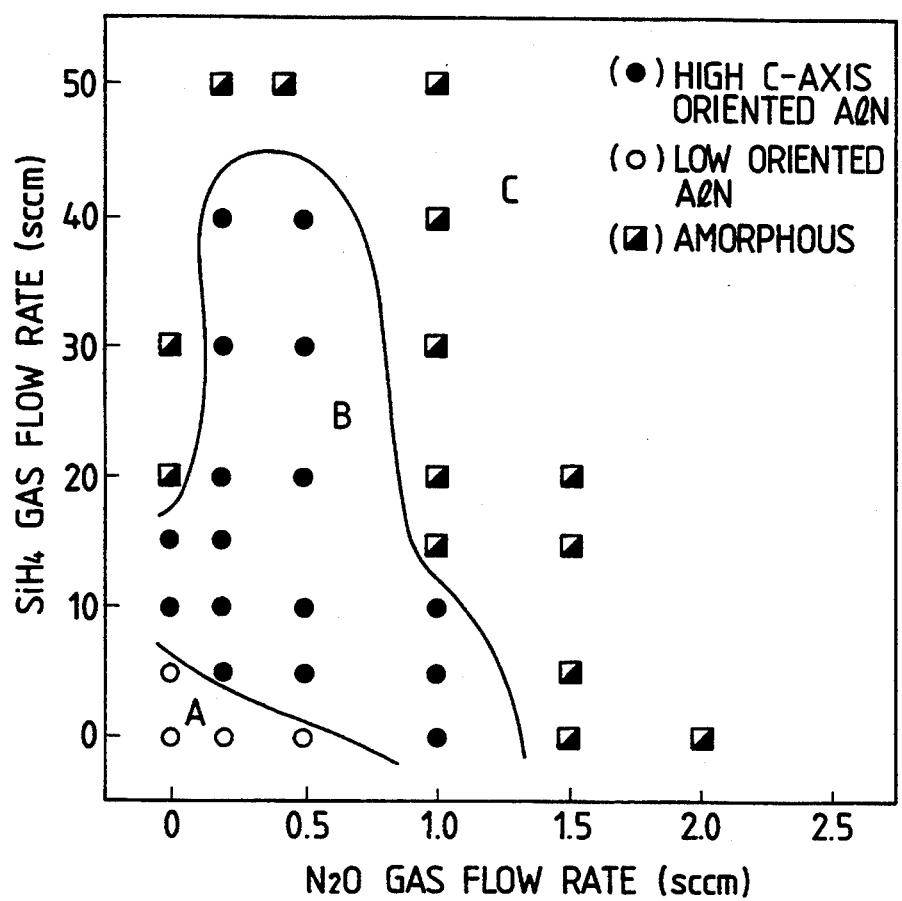
FIG. 3 is a diagram illustrating a relationship between each of gas flow rates and crystallinity based on FIG. 2.

FIG. 2 shows a typical X-ray diffraction pattern examined on the crystallinity of thin films synthesized at a substrate temperature of 530° C. using XRD, and FIG. 3 shows the effect of the flow rate of $N_2O$ and $SiH_4$ gases on the crystallinity of thin films classified based on the result of XRD.

FIGS. 2(a), (b), (c), respectively, show cases of varying the gas flow rate as: (a) for $N_2O$ flow rate of 0 (sccm), $SiH_4$ flow rate of 5 (sccm), (b) for $N_2O$ flow rate of 0.5 (sccm) and $SiH_4$ flow rate of 40 (sccm) and (c) for $N_2O$ flow rate of 0 (sccm) and $SiH_4$ flow rate of 20 (sccm).

In FIG. 3, gas flow rates for $N_2O$ and $SiH_4$ are indicated on the abscissa and the ordinate, respectively, in which the properties of films formed under the synthesis conditions in FIG. 2(a), (b), (c) correspond respectively, to the regions A, B, C in FIG. 3.

It can be seen that the crystallinity of the film changes from the region A in which c-axis of AlN (aluminum nitride) is intensely oriented vertical to the substrate (a region of high c-axis oriented AlN: FIG. 2(a)) to a less oriented region B in which diffraction peaks indexed by (100), (110) of AlN are present together, along with the increase of $N_2O$ and $SiH_4$ gas flow rates (region of less oriented AlN: FIG. 2(b)). Further, as the flow rate for each of the gases is increased, it changes into the region C of an amorphous film in which a broad peak appears near $2\theta = 33° - 36°$ C. (amorphous region: FIG. 2(c)) broad peak appears. On the other hand, if the substrate temperature is set to lower than 500° C., crystallinity of the thin film is lost with addition of $N_2O$ and $SiH_4$ gases.

Figure 4A:
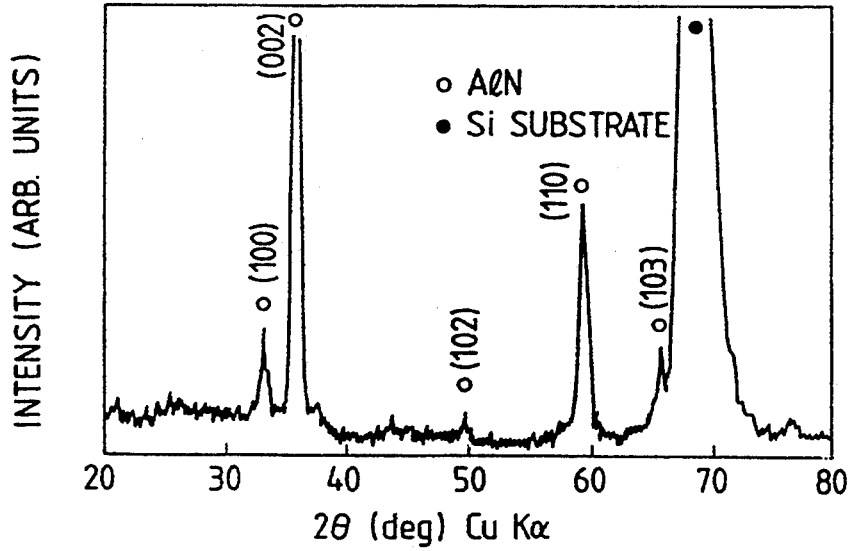
FIGS. 4A–4C are diagrams illustrating X-ray diffraction pattern for films synthesized at a substrate temperature of 770° C.
Figure 4B:
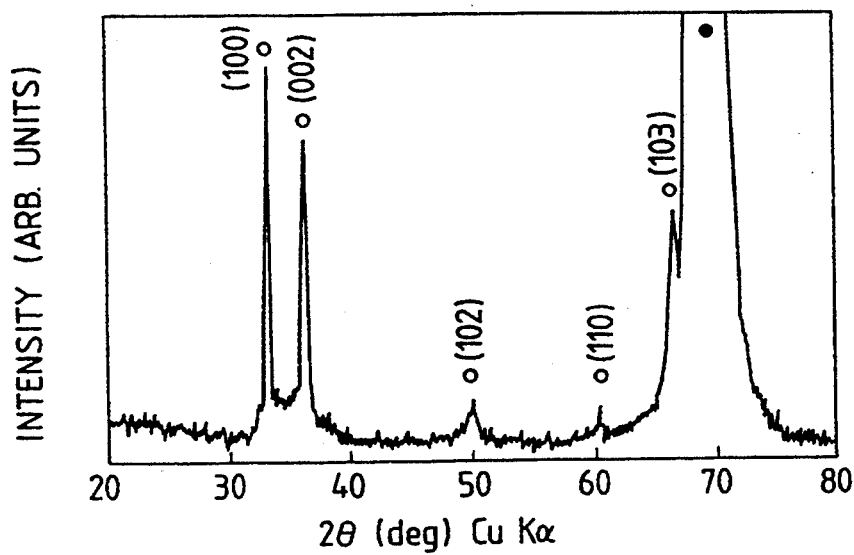
Figure 4C:
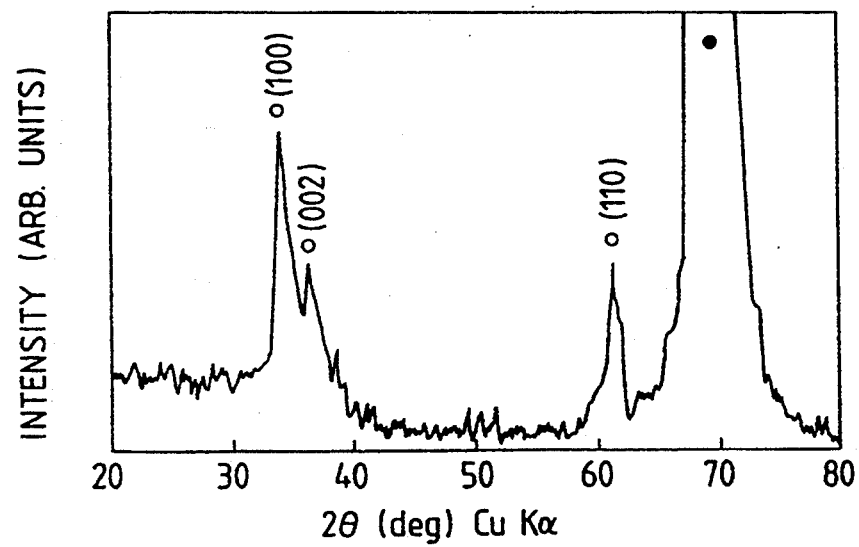
Figure 5:
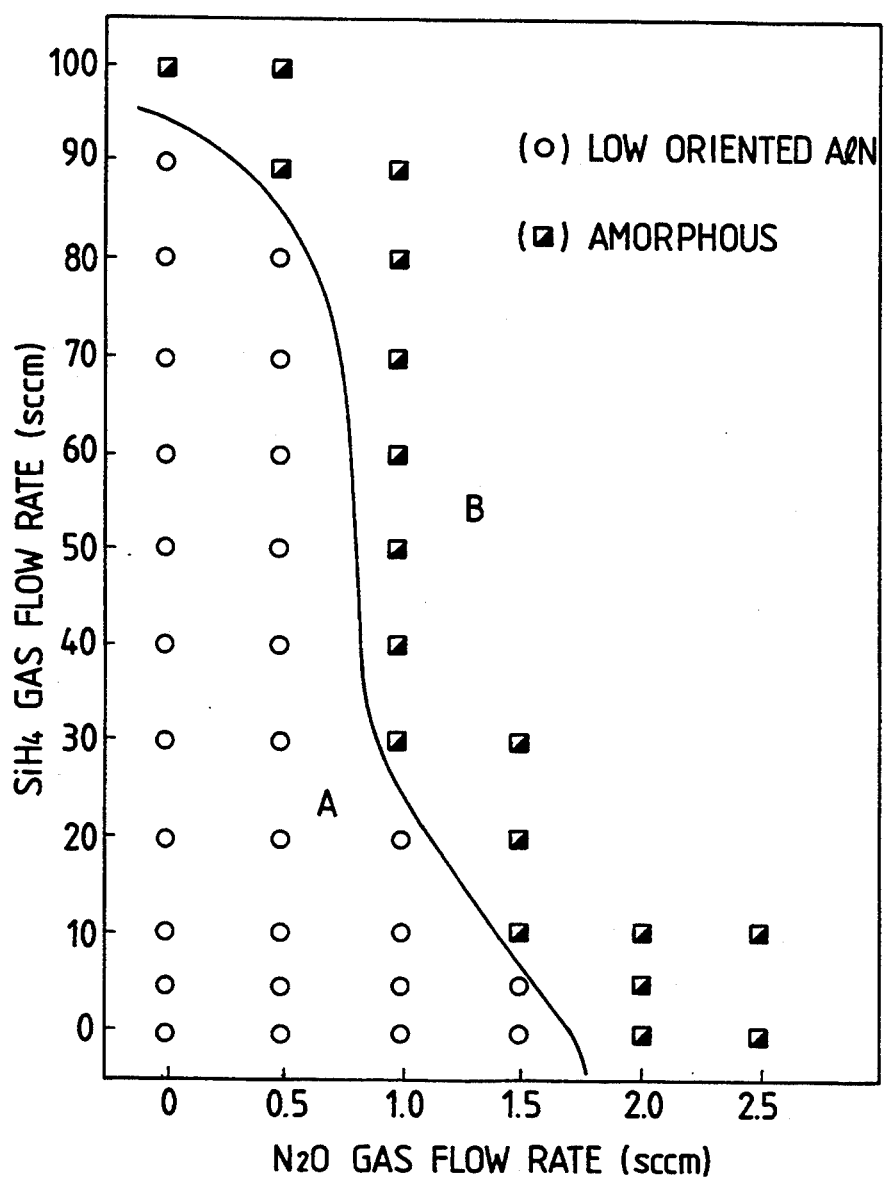
FIG. 5 is a diagram illustrating a relationship between each of gas flow rates and crystallinity based on FIG. 4.

Next, FIG. 4 shows typical X-ray diffraction patterns for films synthesized at a substrate temperature of 770° C. and FIG. 5 shows a range in which a crystalline Al—Si—O—N film is obtained.

In FIG. 4, (a) shows a case for the $N_2O$ flow rate of 0.5 (sccm) and $SiH_4$ flow rate of 10 (sccm), (b) shows a case for the $N_2O$ flow rate of 0.5 (sccm) and $SiH_4$ flow rate of 30 (sccm) and (c) shows a case for the $N_2O$ flow rate of 0.5 (sccm) and $SiH_4$ flow rate of 70 (sccm).

As the substrate temperature is raised, the preferential orientation of the AlN film at the gas flow rate of $N_2O$ and $SiH_4$ of 0 (sccm) lowers from about 650° C. and the preferential orientation is lost at 770° C. On the other hand, FIG. 5 reveals that the range capable of obtaining a crystalline film (region A) is extended at a high temperature till a condition in which the gas flow rates of $N_2O$ and $SiH_4$ are increased during synthesis. As shown in FIG. 4, in the diffraction pattern for the synthesized crystalline thin films, diffraction peaks indexed by (100), (110) of AlN appear like that in the case of the substrate temperature at 530° C., and the relative intensity of diffraction peaks indexed by AlN (002) is decreased along with increase of the $SiH_4$ gas flow rate.

As described above, crystalline sialon films are obtainable in the regions A, B of FIG. 3 and the region A of FIG. 5.

Figure 6:
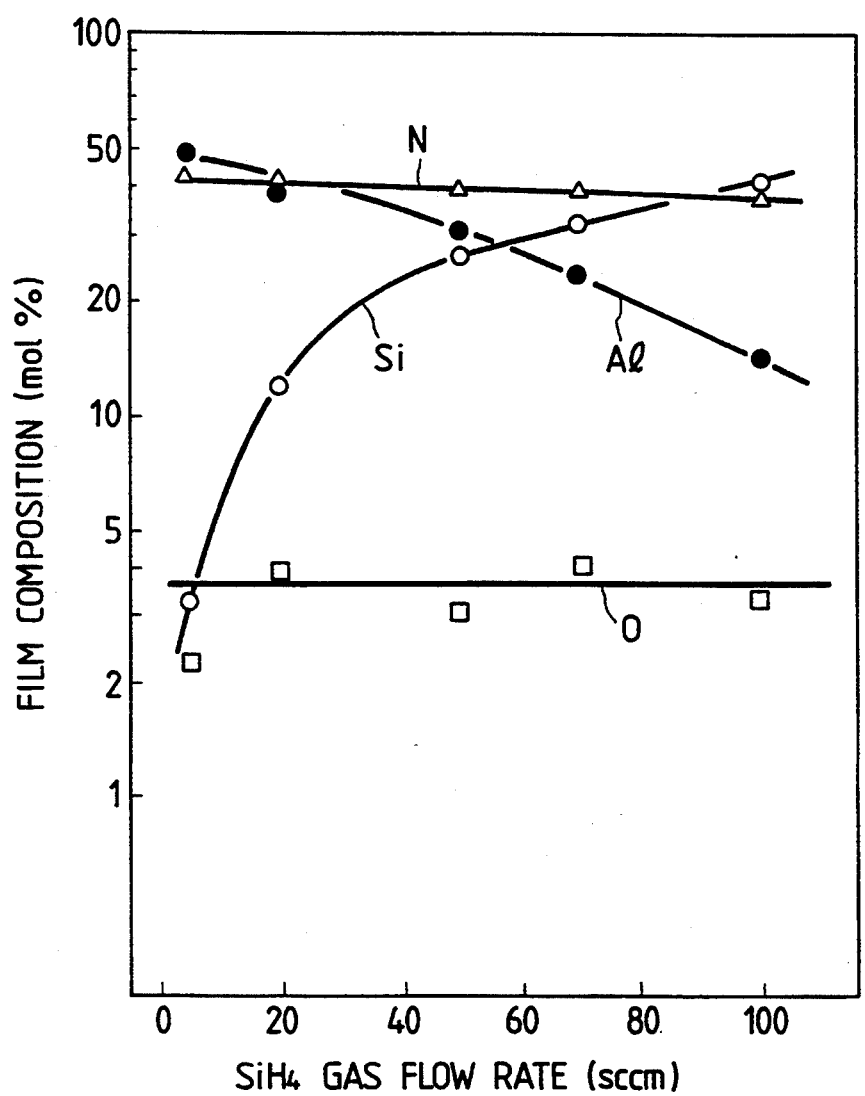
FIG. 6 is a diagram for explaining a relationship between $SiH_4$ gas flow rate and film composition upon synthesis at a substrate temperature of 770° C.

Then, FIG. 6 shows a result for the study on the change of the $SiH_4$ gas flow rate while setting the substrate temperature at 770° C. and the $N_2O$ gas flow rate to 0.5 (sccm) and on the film compositions depending on the change.

Referring to the concentrations of nitrogen and oxygen in the film, they were kept substantially at constant levels (about 40 (mol %) for N concentration and about 4 (mol %) for O concentration) in each of $SiH_4$ gas flow rates. Further, the silicon (Si) concentration increased along with increase of the $SiH_4$ gas flow rate and reached about 40 (mol %) at the $SiH_4$ gas flow rate of 100 (sccm).

Figure 7:
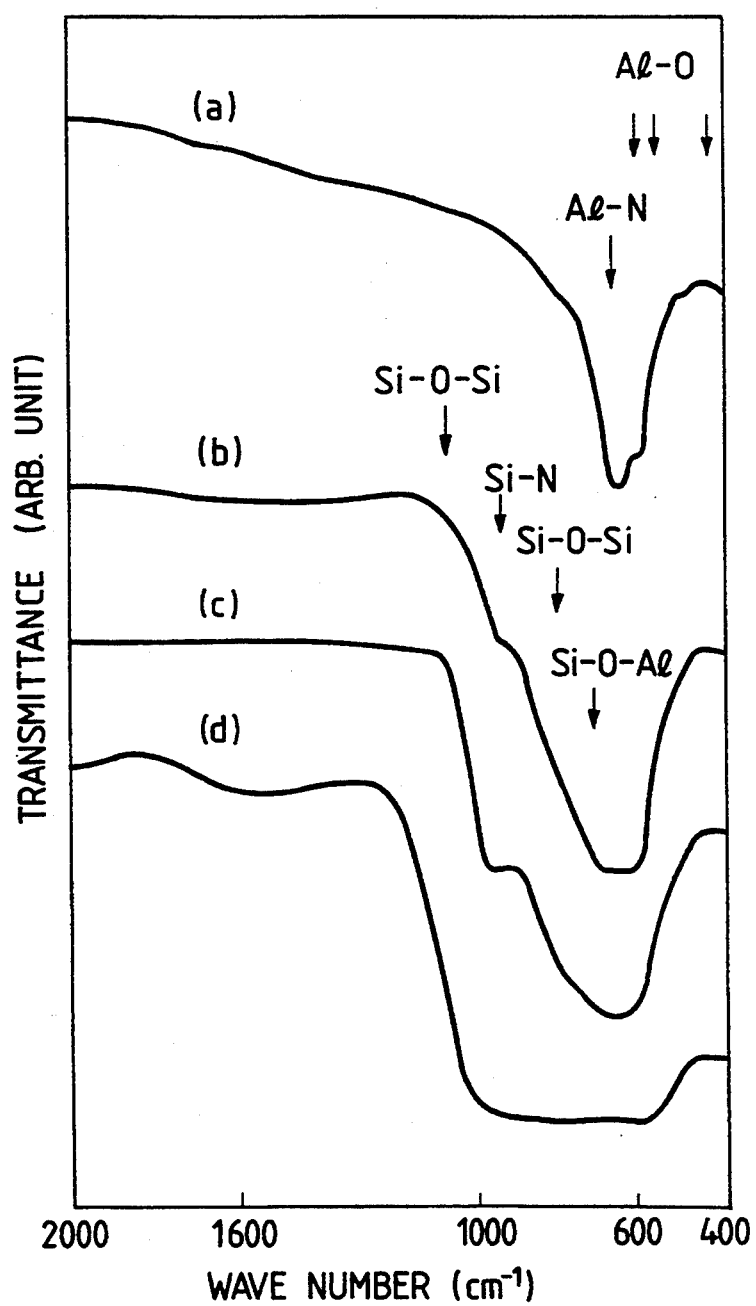
FIG. 7 is a diagram illustrating the result of spectroscopy on synthesized films.
Figure 8:
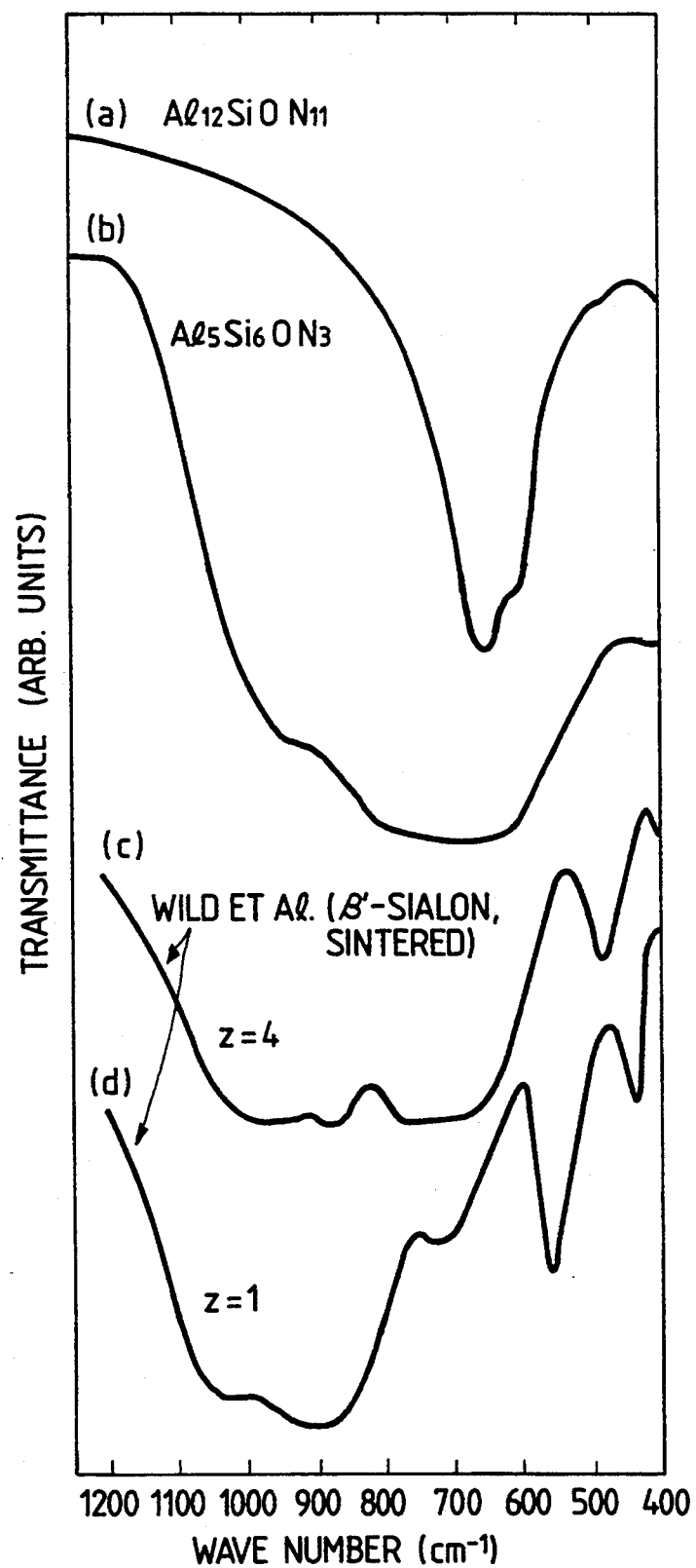
FIG. 8 is a diagram illustrating the result of spectroscopy on synthesized films.

FIGS. 7 and 8 illustrate the result of spectroscopy, measured by transmission method, on crystalline sialon films obtained by the result of the synthesis described above (IR profile).

FIG. 7(a), (b), (c), (d) show the result obtained by increasing the $SiH_4$ gas flow rate to 0 (sccm), 5 (sccm), 20 (sccm) and 70 (sccm), respectively, while setting the $N_2$ gas flow rate to 0.5 (sccm). FIG. 8(a), (b) also show the result obtained by increasing the $SiH_4$ gas flow rate to 5 (sccm) and 40 (sccm), respectively, while setting the $N_2O$ gas flow rate to 0.5 (sccm).

As shown in FIG. 7(a), at the $SiH_4$ gas flow rate of 0 (sccm), absorption belonging to Al—N bond (650 cm$^{-1}$) was predominant. As shown in FIG. 7(b)-(d), when the $SiH_4$ gas flow rate was increased, absorption from (700 cm$^{-1}$) to (1100 cm$^{-1}$) belonging to bonds of Si and O, Si and N, and Si, O and Al (Si—O—Al: 700 cm$^{-1}$, Si—N: 950 cm$^{-1}$, Si—O—Si: 810, 1070 cm$^{-1}$), as well as absorption belonging to Al—O bond (433, 571, 635 cm$^{-1}$) are increased while leaving AlN bond by the increase of the Si concentration in the film. As shown by FIG. 7(d), when the $SiH_4$ gas flow rate is increased to 70 (sccm), absorption is found over a wide range around 500–1100 cm$^{-1}$.

The foregoing results reveal that a network of Si—(O, N)—Al is formed in the synthesized crystalline Al—Si—O—N film.

Wild, et al report the result of IR measurement on $\beta'$ sialon ($Si_{6-z}Al_zO_zN_{8-z}$) synthesized by the sintering process. In the respect, they describe that absorption around 650–800 cm$^{-1}$ different from absorption belonging to $Si_3N_4$ is increased by the increased amount of replacement of Al, O for $Si_3N_4$, that is, by the increase of z value. They further state that this results in the change of a structure more similar to phinacite ($Be_2SIO_4$) structure by the increase of the z value in $\beta'$ sialon.

FIG. 8 shows, in comparison, IR profiles of amorphous Al—Si—O—N films having two different compositions ($Al_{12}SiON_{11}$, $Al_5Si_6ON_8$) in the present invention (FIG. 8(a), (b)) and profiles of $\beta'$ sialon of Wild, et al (z=1: $Si_5AlON_7$, z=4: $Si_2Al_4O_4N_4$) (FIG. 8(c), (b)). As apparent from XRD, the crystalline Al—Si—O—N thin films in the present invention are similar to a wurtzite structure which is a structure different from $\beta'$-$Si_3N_4$ or phinacite.

Figure 9A:
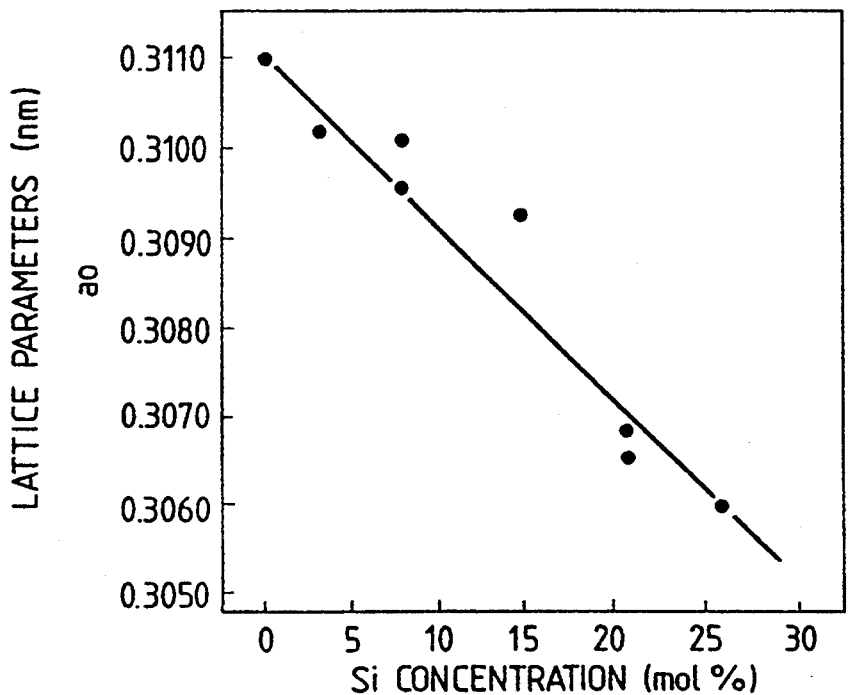
FIGS. 9A and 9B are diagrams illustrating the decrease of lattice parameters of synthesized film.
Figure 9B:
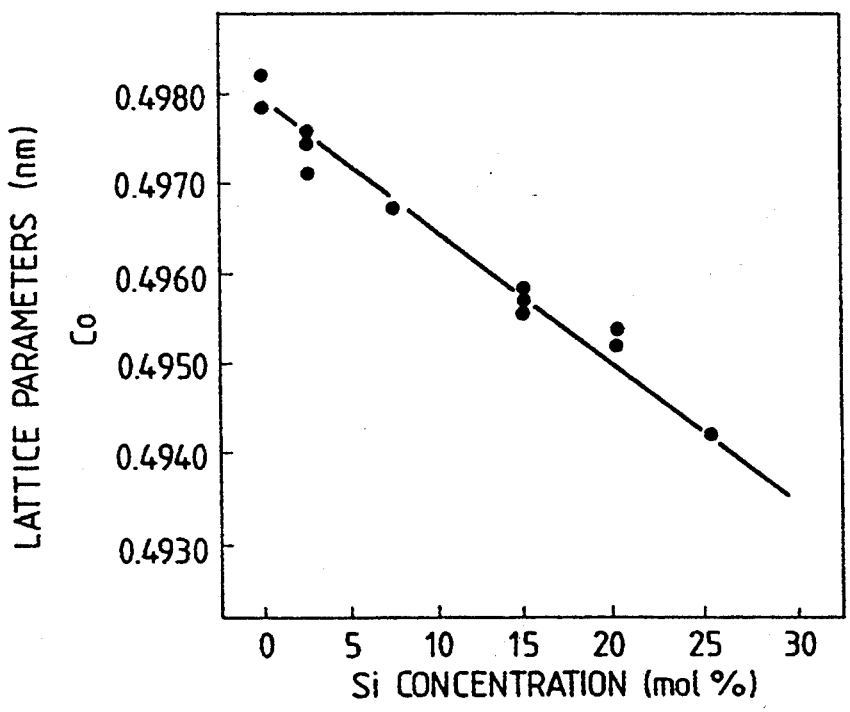

FIG. 9A and 9B illustrate lattice parameters for a-axis and c-axis of crystalline sialon films synthesized under the conditions at a substrate temperature of 770° C. and the $N_2O$ gas flow rate of 0.5 (sccm), in which the lattice parameters decrease substantially in proportion with the increase of the Si concentration in the film. This means that a unit cell volume is decreased by about 4% at Si 25 (mol %) in the film.

The decrease of the unit cell volume is attributable to the difference of atom bonding length caused by replacement of the Al position with Si and replacement of the N position with O, respectively in the AlN crystals. Namely, the tetrahedral covalent bond lengths between Al—N, between Si—N and between Al—O are, respectively, $L_{(Al-N)}=0.191$ nm, $L_{(Si-N)}=0.175$ and $L_{(Al-O)}=0.175$ nm, respectively.

Figure 13B:
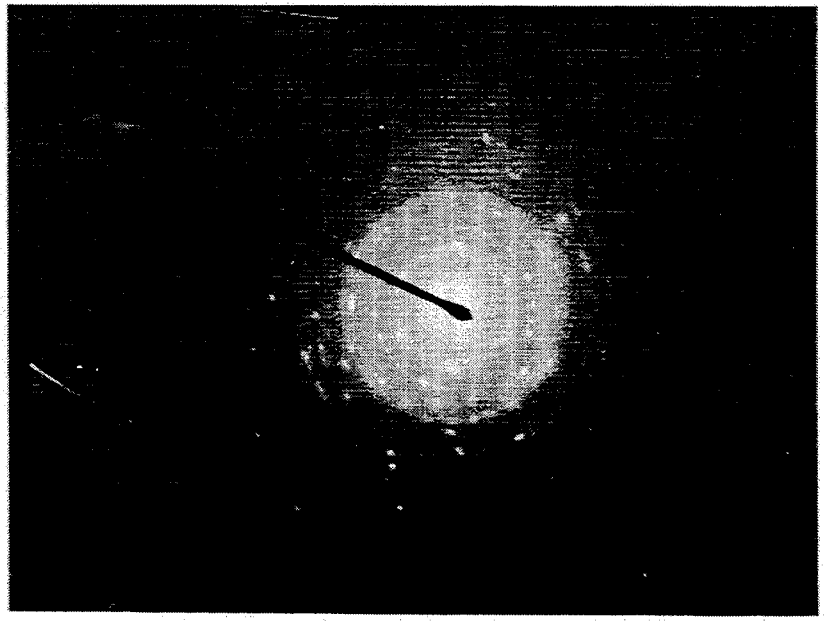
FIGS. 13(a) and 13(b) show a synthesis examples under a condition of $SiH_4$ gas flow rate at 10 (sccm) in which (a) is electron microscopic photograph showing the crystal structure and (b) is X-ray photograph.
Figure 13A:
Figure 15B:
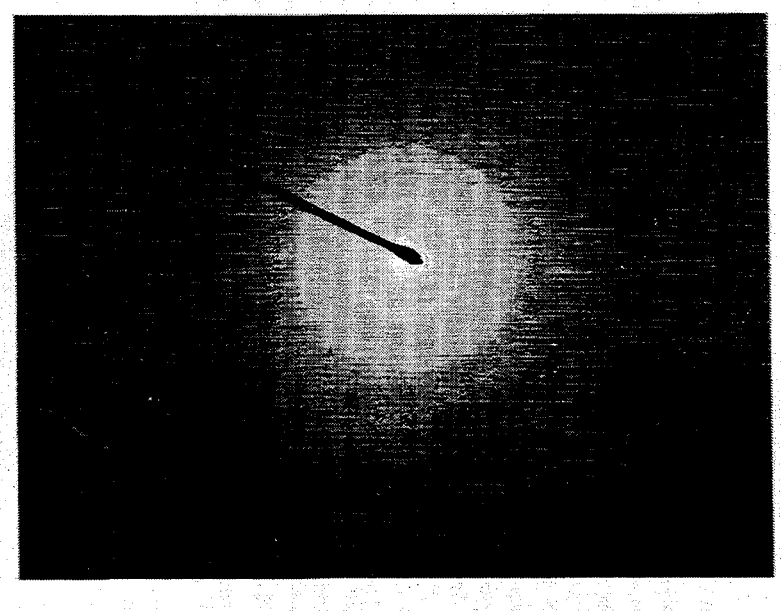
FIGS. 15(a) and 15(b) show a synthesis examples under a condition of $SiH_4$ gas flow rate at 40 (sccm) in which (a) is electron microscopic photograph showing the crystal structure and (b) is X-ray photograph.
Figure 15A:

Next, FIG. 13(a), (b), FIG. 14(a), (b) and FIG. 15(a), (b) illustrate the result on the study of micro structure of Al—Si—O—N films according to the present invention by using TEM.

Each of them shows the result of synthesis by changing the SiH$_4$ gas flow rate to 10 (sccm) (FIG. 13), 20 (sccm) (FIG. 14) and 70 (sccm) (FIG. 15) while setting the substrate temperature at 770° C. and the N$_2$O gas flow rate to 0.5 (sccm).

At the SiH$_4$ gas flow rate of 10 (sccm) and 20 (sccm), namely in FIGS. 13 and 14, a tissue having a plate-like shape of about 200 nm side length can be seen. In view of the micro tissue and SAD pattern, it can be seen that the crystalline sialon film of the present invention is a crystalline sialon film having hexagonal system of the wurtzite structure in which Si and O are dispersed at random on each of lattice sites.

Figure 10:
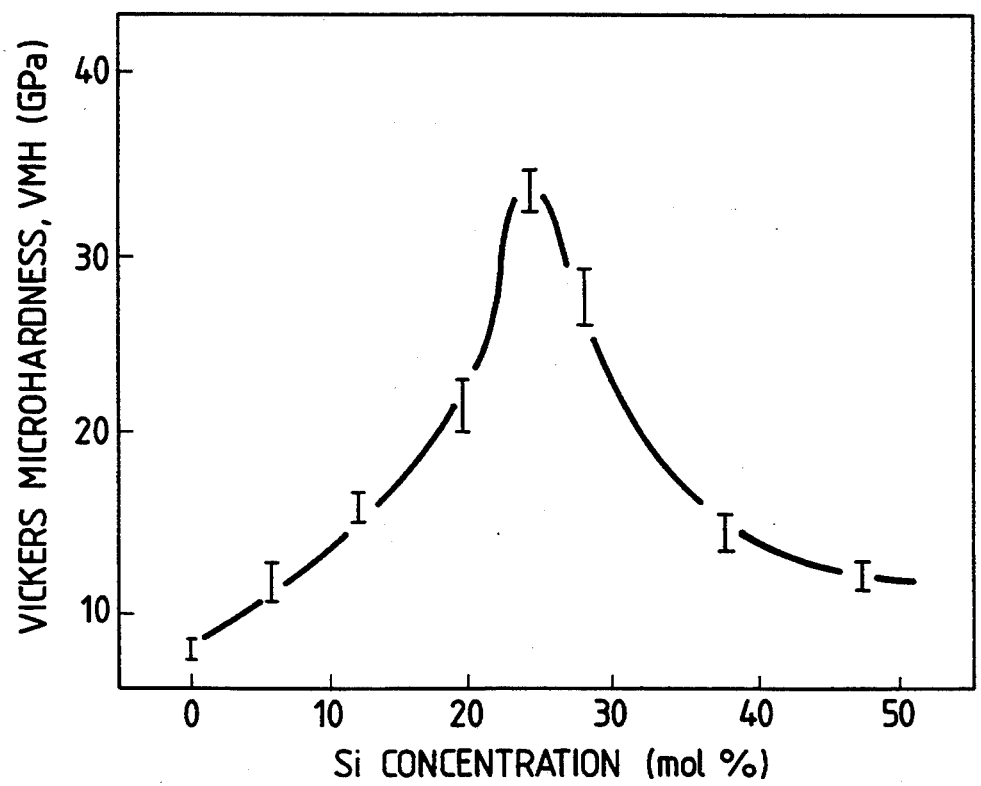
FIG. 10 is a diagram showing Vickers hardness of synthesized films.

On the other hand, at the SiH$_4$ gas flow rate of 40 (sccm), namely, in FIG. 15, it has a homogeneous tissue comprising an assembly of fine and isometrical crystal grains of about 100 nm grain size. However, it can be seen from the result of XRD, SAD and IR that the crystalline sialon film obtained under the conditions have a hexagonal system wurtzite structure. Characteristics of Synthesized Crystalline Sialon Film FIG. 10 illustrates a relationship between Vickers micro hardness of the Al—Si—O—N film having the wurtzite structure synthesized at a substrate temperature of 770° C. and the Si concentration in the film.

The Vickers hardness (Hmv) increases along with increase of the Si concentration within a range of the Si concentration in the thin film of bout 25 (mol %) (N$_2$O gas flow rate at 0.5 (sccm) and SiH$_4$ gas flow rate at 40 (sccm)), and a maximum value of about 34 GPa is obtained at 25 (mol %). The value is greater by about 70% than a mean value of the $\beta'$ sialon synthesized by the sintering process (20 GPa).

The Al—Si—O—N film containing silicon at about 25 (mol %) with which the maximum value for Hmv was obtained has a homogeneous tissue comprising an assembly of fine crystal particles of about 10 nm grain size. This is a main cause that a high hardness can be obtained.

On the other hand, the hardness decreases conversely in a region in which the Si concentration in the film exceeds 25 (mol %), and the micro Vickers hardness was reduced to about 12 GPa in the amorphous Al—Si—O—N thin film.

Figure 11:
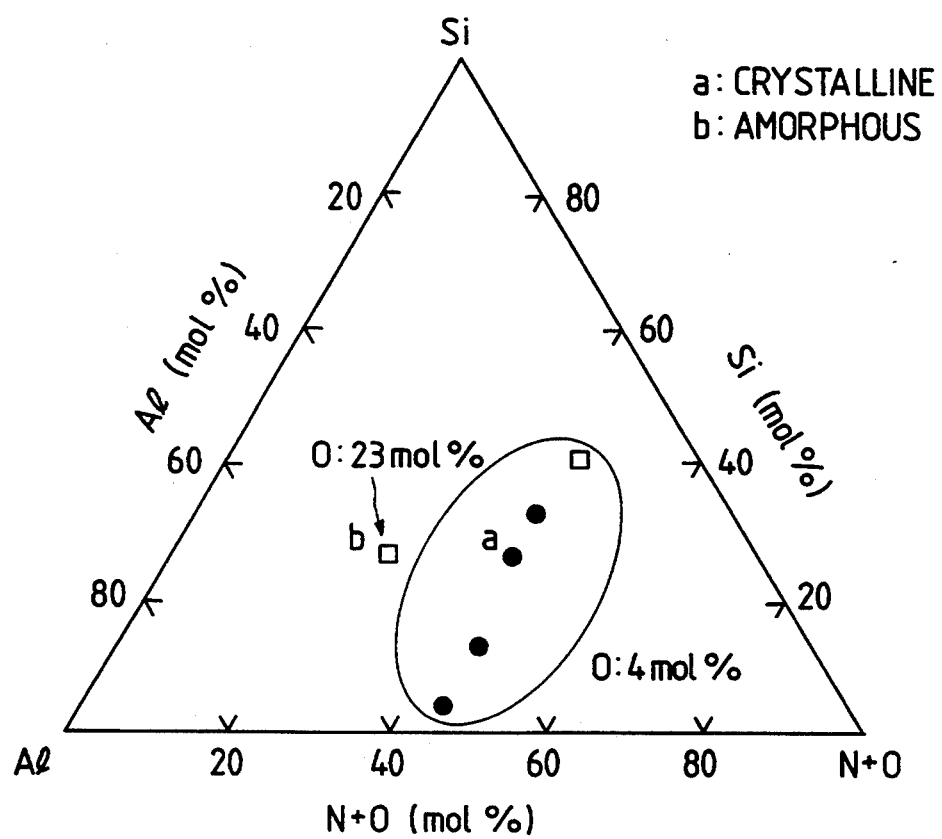
FIG. 11 is a diagram explaining compositions for wurtzite structure crystalline sialon according to the present invention and amorphous sialon.

In FIG. 11, the region g explains the composition of the crystalline sialon having the wurtzite structure according to the present invention and b explains the composition for the amorphous Al—Si—O—N film.

Stability of the thin film surface tissue of the sialon according to the present invention in the region a and the amorphous film in the region b upon heating in ambient atmosphere are examined respectively and the result is shown below.

Figure 12A:
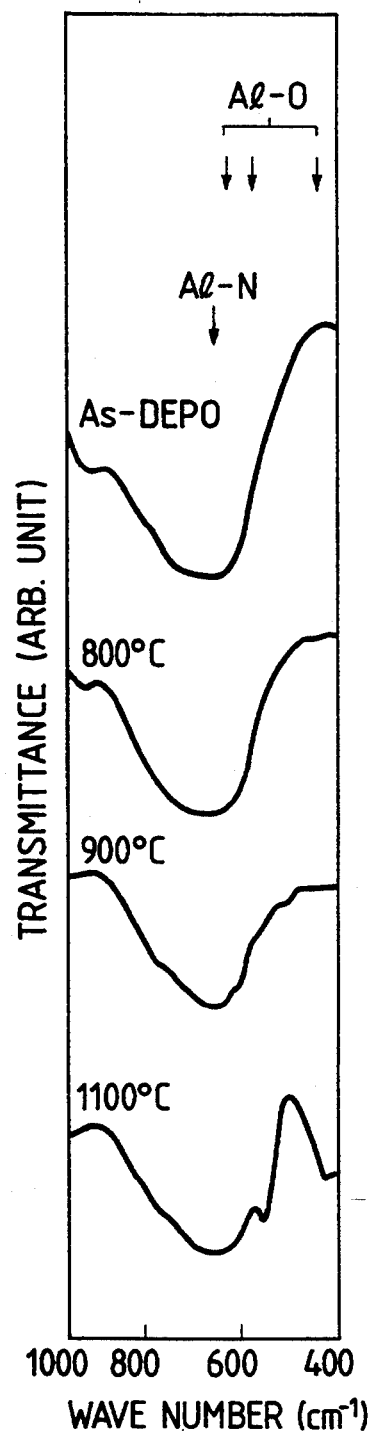
FIGS. 12(a) and 12(b) are diagrams illustrating the result of spectroscopy when heat treatment is applied, in which (a) shows a result for crystalline sialon of wurtzite structure according to the present invention and (b) shows a result for amorphous sialon.
Figure 12B:
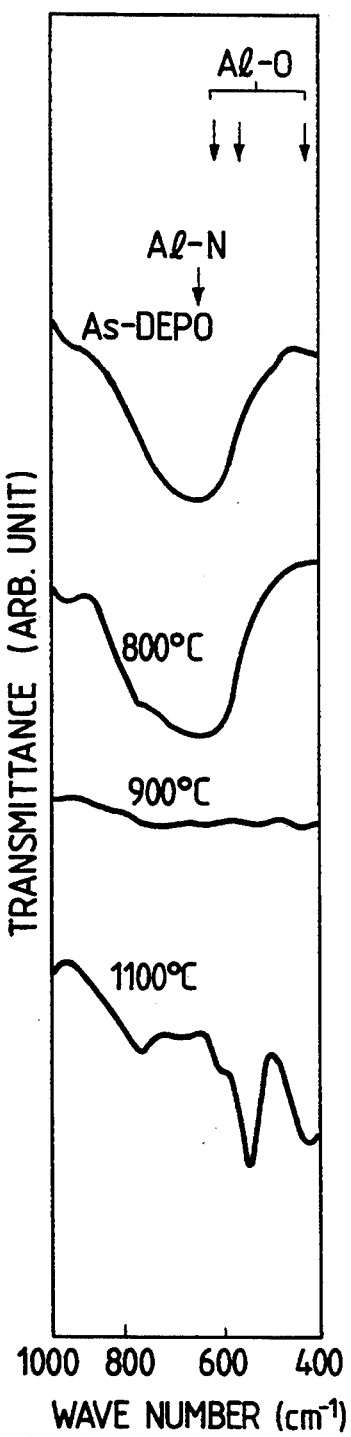

FIG. 12 illustrates IR patterns after applying heat treatment to both of the films in a and b at an arbitrary temperature within a range of 800° to 1100° C. for about 12 hours.

a: In a case of the crystalline sialon film, although absorption belonging to the Al—O bond increased at 1100° C., absorption belonging to the Al—N bond was basically predominant and no remarkable structural change was observed.

b: In a case of amorphous Al—Si—O—N film, absorption belonging to the Al—N bond was eliminated from about 900° C., and absorption belonging to the Al—O bond became predominant at 1100° C., showing that the stability of the surface to the thermal oxidation is low.

Figure 16A:
FIGS. 16(a), 16(b) and 16(c) are electron microscope photographs showing the change of crystal structure when crystalline sialon of a wurtzite structure according to the present invention is applied with heat treatment.
Figure 16B:
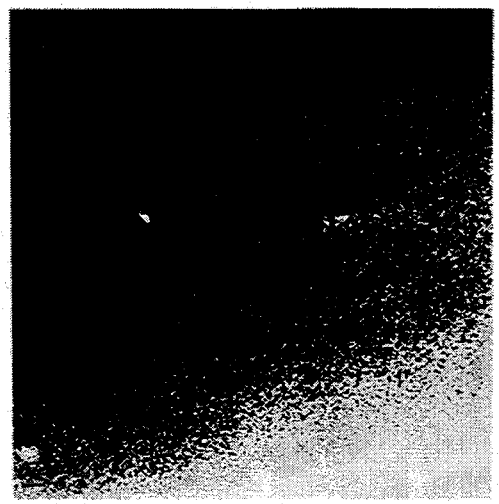
Figure 16C:
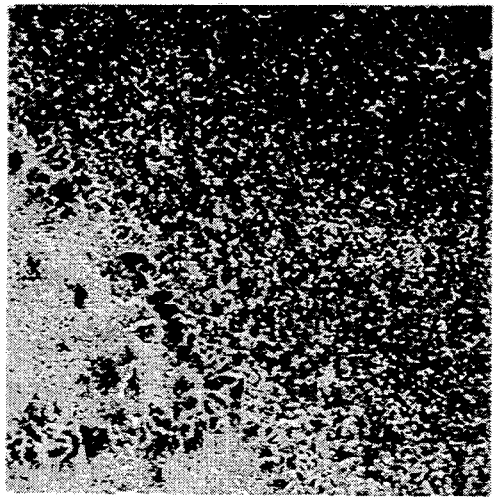
Figure 17A:
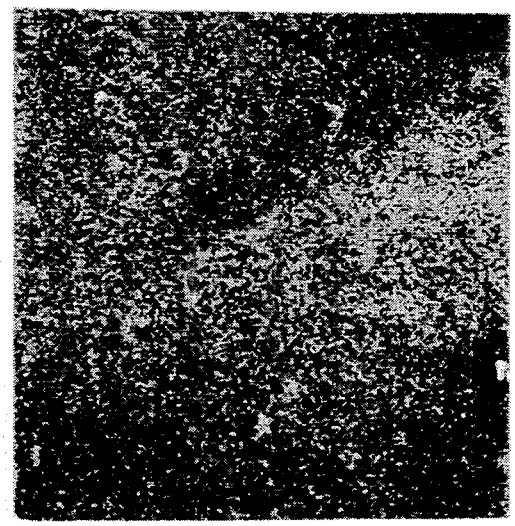
FIGS. 17(a), 17(b) and 17(c) are electron microscope photographs showing the change of crystal structure when amorphous sialon is applied with heat treatment.
Figure 17B:
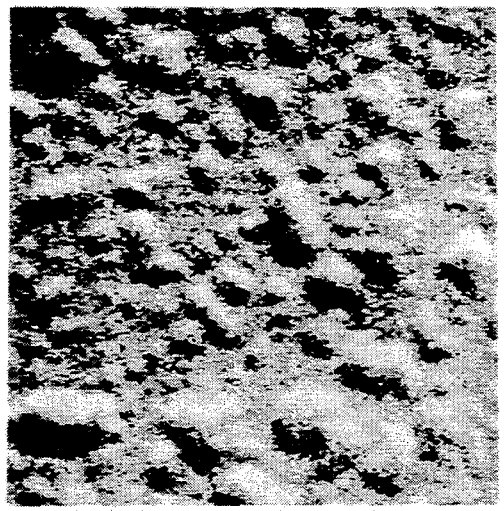
Figure 17C:
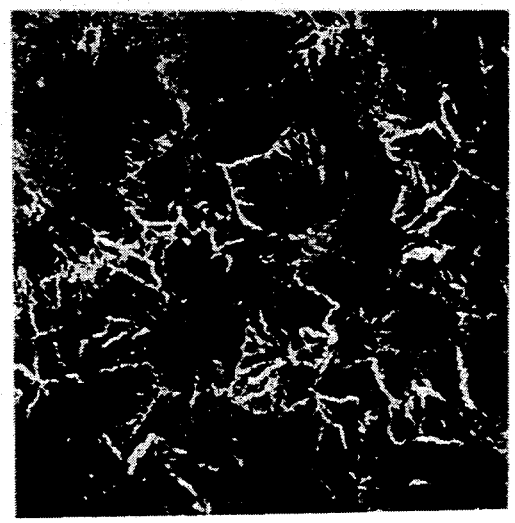

Further, FIG. 16 is an electron microscopic photograph illustrating the surface tissues for both films in a and b upon heat treatment test as described above. The photographs reveal the followings.

a: In a case of the crystalline sialon film, surface tissue showed no substantially change up to 1000° C., whereas b: in a case of the amorphous Al—Si—O—N thin film, granular deposition was formed at 800° C., the surface tissue changed into a dome-like shape at 900° C. and mesh-like Al$_2$O$_3$ deposition was observed at 1100° C.

The result as described above shows that the crystalline sialon film having the wurtzite structure is excellent in the hardness and the oxidation resistance.

Furthermore, it has been recognized that the crystalline sialon film is also excellent in heat conductivity and adhesion with a superhard substrate.

As has been described above, according to the present invention, it is possible to provide a crystalline sialon excellent in oxidation resistance at high hardness not obtainable so far, as well as also excellent in heat conductivity and adhesion with a superhard substrate.

What is claimed is:

1. A crystalline sialon comprising crystals containing aluminum, silicon, nitrogen and oxygen;
    wherein the crystal structure has a hexagonal system wurtzite unit cell structure identical with that of AlN crystals, and
    wherein silicon atoms randomly replace one or more aluminum atoms, and oxygen atoms randomly replace one or more nitrogen atoms within the unit cell structure, thereby causing a volume of the unit cells to have a value smaller than that of the AlN crystals.

2. The crystalline sialon of claim 1, wherein the amount of silicon in the crystalline sialon is less than 40 mol %.

* * * * *